# 2,950,274
Patented Aug. 23, 1960

2,950,274

AZO-DYESTUFFS INSOLUBLE IN WATER

Herbert Kracker, Roland Bamberger, Reinhard Mohr, and Joachim Ribka, all of Offenbach (Main), Germany, assignors to Farbwerke Hoechst Aktiengesellschaft vormals Meister Lucius & Brüning, Frankfurt am Main, Germany, a corporation of Germany No Drawing. Filed June 11, 1958, Ser. No. 741,221

Claims priority, application Germany June 15, 1957

6 Claims. (Cl. 260—145)

The present invention relates to new azo-dyestuffs insoluble in water and to a process for preparing the same; more particularly the invention relates to the complex iron, cobalt, chromium, nickel, copper and manganese compounds of azo-dyestuffs corresponding to the following general formula

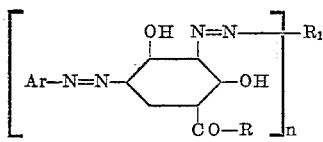

wherein Ar represents a radical of the benzene or naphthalene series containing in ortho-position to the azo group a group capable of forming complex metal compounds, R represents an alkyl, aryl, cycloalkyl or aralkyl radical, $R_1$ represents a radical of the benzene, diphenyl or anthraquinone series, and $n$ stands for one of the numbers 1 and 2.

We have found that valuable new azo-dyestuffs insoluble in water are obtained by coupling a complex iron, cobalt, chromium, nickel, copper or manganese compound of an azo-dyestuff of the following general formula

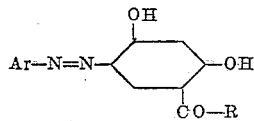

wherein Ar represents a radical of the benzene or naphthalene series containing in ortho-position to the azo group a group capable of forming complex metal compounds, and R represents an alkyl, aryl, cycloalkyl or aralkyl radical, with a diazo- or tetrazo-compound of a primary aromatic mono- or diamine, the components being free from groups imparting solubility in water.

The process of this invention yields on vegetable fibers and fibers of regenerated cellulose, according to the known dyeing and printing processes, valuable and mainly brown to black dyestuffs which are distinguished by good properties of fastness.

Diazo- or tetrazo-compounds which can be used in this invention are diazonium or tetrazonium salts, for example diazonium chloride-zinc chloride double salts, diazonium aryl sulfonates or diazonium sulfates, diazoamino- or tetrazoamino compounds or antidiazotates from primary aromatic mono- or diamines.

In the present process, coupling components are used the radical Ar of which is free from sulfonic acid groups or such carboxylic acid groups as do not serve for the formation of complex metal compounds, but may be substituted by a halogen atom, a nitro, alkyl, sulfonamide or alkylsulfonyl group. These coupling components are disclosed for example in U.S. patent application Serial No. 727,034, filed on April 8, 1958, in the name of Herbert Kracker, Roland Bamberger, Reinhard Mohr and Joachim Ribka.

The following examples serve to illustrate the invention, but they are not intended to limit it thereto.

Example 1

Cotton fabric is padded on the foulard with the following solution and dried:

20 grams of the complex cobalt compound of the monoazo-dyestuff of the following formula

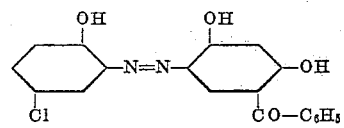

(obtainable by coupling diazotized 1-amino-2-hydroxy-5-chlorobenzene with 2,4-dihydroxybenzophenone) are pasted up with 20 cc. of sodium hydroxide solution of 38° Bé.,
20 grams of Monopol Brilliant oil, and
40 cc. of water, and after the addition of
50 grams of tragacanth 60:1000 made up to 1 liter with boiling water.

The dried fabric is developed on the foulard with a diazo solution containing, per liter of water, 60 grams of 1-amino-2,5-dichlorobenzene in the form of the diazonium chloride-zinc chloride double salt, and 40 grams of sodium acetate. After an air-passage for 1 minute the material is treated for a short time in water of 80° C., soaped at 95° C. with a solution containing, per liter of water, 1 gram of a reaction product of about 10 mols of ethylene oxide and 1 mol of isododecyl phenol, and furthermore 3 grams of sodium carbonate, rinsed and dried. A red-brown dyeing of good fastness properties, especially of a very good fastness to light, is obtained. The dyeing process can also be carried out on other fibers, such as viscose or rayon.

Example 2

60 grams of a mixture (A) containing, in 100 grams, 38.4 grams of the complex cobalt compound of the monoazo-dyestuff from diazotized 1-amino-2-hydroxy-5-chlorobenzene and 2,4-dihydroxy-benzophenone, and furthermore 26 grams of the antidiazotate from 1-amino-2-methoxy-5-chlorobenzene with a content of 52% of the base, are dissolved in 30 grams of denatured alcohol,
20 grams of Monopol Brilliant oil,
30 grams of sodium hydroxide solution of 38° Bé. and
300 grams of water. The solution so obtained is added, while stirring, to
500 grams of a neutral starch-tragacanth thickening and after the addition of
50 grams of a 30% sodium chromate solution made up with water to 1 kilogram.

Cotton material is printed with the printing paste so obtained. The material is then dried, steamed in an acid medium for 7 minutes, rinsed cold and hot, soaped for 10 minutes with a boiling solution containing, per liter of water, 1 gram of sodium carbonate and 1 gram of a condensation product from an amino alkyl sulfonic acid and a high molecular fatty acid, rinsed again and dried. A reddish brown print is obtained.

When in the above example, the mixture (A) is replaced by a mixture containing, per 100 grams, 38.4 grams of a complex cobalt compound of the monoazo-dyestuff from diazotized 1-amino-2-hydroxy-5-chlorobenzene and 2,4-dihydroxybenzophenone, and furthermore 25 grams of the antidiazotate from 4,4'-diamino- 3,3'-dimethoxydiphenyl with a content of 41.5% of the base, a dark brown print is obtained.

*Example 3*

60 grams of a mixture containing, per 100 grams, 38.4 grams of the complex cobalt compound of the monoazo-dyestuff from diazotized 1-amino-2-hydroxy-5-chlorobenzene and 2,4-dihydroxy-benzophenone, and furthermore 27 grams of the diazoamino compound from diazotized 1-amino-2-methyl-5-chlorobenzene and 1-aminobenzene-2-carboxylic acid-5-sulfonic acid, are dissolved as described in Example 2 and worked up to a printing paste. Cotton fabric is printed with the printing paste so obtained. The material is then dried, steamed for 7 minutes in an acid medium, and the treatment is completed as described in Example 2. A medium brown print is obtained.

*Example 4*

Cotton fabric is padded on the foulard with the following solution and dried:

20 grams of the complex chromium compound of the monoazo-dyestuff of the following formula

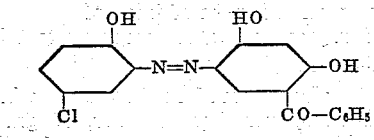

(obtainable by coupling diazotized 1-amino-2-hydroxy-5-chlorobenzene with 2,4-dihydroxybenzophenone) are pasted up with
20 cc. of sodium hydroxide solution of 38° Bé.,
20 grams of Monopol Brilliant oil, and
40 cc. of water, and after the addition of
50 grams of tragacanth 60:1000 made up with boiling water to 1 liter.

The dried fabric is developed on the foulard with a diazo solution containing, per liter of water, 22 grams of 4-amino-3,2'-dimethyl-1,1'-azobenzene in the form of the diazonium sulfate and furthermore 40 grams of sodium acetate.

After an air-passage for 1 minute, the material is treated for a short time in water of 80° C., soaped at 95° C. with a solution containing, per liter of water, 1 gram of a reaction product of about 10 mols of ethylene oxide and 1 mol of isododecyl phenol, and furthermore 3 grams of sodium carbonate, rinsed and dried.

A black-brown dyeing of good fastness properties is obtained. The dyeing process can also be carried out on other fibers, such as viscose or rayon.

The following table indicates a number of further components which can be used in this invention and also the tints of the azo-dyestuffs obtainable from these components, which likewise possess good properties of fastness:

| Coupling component | Diazo component | Tint |
| --- | --- | --- |
| 1-amino-2-hydroxy-5-chlorobenzene → 2,4-dihydroxy-benzophenone, complex cobalt compound. | 1-amino-2-methoxy-5-benzylsulphonylbenzene. | reddish brown. |
| Do. | 1-amino-5-chloro-2-phenoxybenzene. | Do. |
| Do. | 1-amino-2-methoxybenzene-5-sulphonic acid diethylamide. | Do. |
| Do. | 1-amino-5-chloro-2-(4'-chloro)-phenoxybenzene. | Do. |
| Do. | 4-amino-3,2'-dimethyl-1,1'-azobenzene. | dark brown. |
| 1-amino-2-hydroxy-5-methylbenzene → 2,4-dihydroxy-benzophenone, complex cobalt compound. | 1-aminoanthraquinone. | full brown. |
| 1-amino-2-hydroxy-5-nitrobenzene → 2,4-dihydroxybenzophenone, complex cobalt compound. | do. | red brown. |
| 1-amino-2-hydroxy-5-methylsulfonylbenzene → 2,4-dihydroxybenzophenone, complex cobalt compound. | 1-amino-2-methoxy-5-benzylsulfonylbenzene. | dark brown. |
| 1-amino-2-hydroxy-5-chlorobenzene → 2,4-dihydroxybenzophenone, complex iron compound. | 1-aminoanthraquinone. | Do. |
| Do. | 2-amino-4-methoxy-5-methyl-2'-chloro-4'-nitro-1,1'-azobenzene. | Do. |
| Do. | 1-amino-2-methyl-4-benzoylamino-5-chlorobenzene. | black brown. |
| 1-amino-2-hydroxy-5-chlorobenzene → 2,4-dihydroxy-benzophenone, complex cobalt compound. | 1-amino-2-methoxy-4-nitrobenzene. | reddish brown. |
| 1-amino-2-hydroxy-5-methylbenzene → 2,4-dihydroxy-benzophenone, complex iron compound. | 1-amino-2-methoxy-5-chlorobenzene. | medium brown. |
| 1-amino-2-hydroxy-5-chlorobenzene → 2,4-dihydroxy-phenylmethylketone, complex cobalt compound. | 1-amino-2-chloro-5-trifluoromethylbenzene. | red-brown. |
| Do. | 2-amino-4-methoxy-5-methyl-2'-chloro-4'-nitro-1,1'-azobenzene. | Do. |
| 1-amino-2-hydroxy-5-chlorobenzene → 2,4-dihydroxy-phenylmethylketone, complex iron compound. | do. | reddish dark brown. |
| 1-amino-2-hydroxy-5-methylbenzene → 2,4-dihydroxy-phenylmethylketone, complex chromium compound. | 1-aminoanthraquinone. | reddish brown. |
| Do. | 1-amino-2-methyl-4-benzoylamino-5-chlorobenzene. | Do. |
| Do. | 4-amino-3,2'-dimethyl-1,1'-azobenzene. | Do. |
| 1-amino-2-hydroxy-5-chlorobenzene → 2,4-dihydroxy-phenylmethylketone, complex chromium compound. | do. | red-brown. |
| 1-amino-2-hydroxy-5-chlorobenzene → 2,4-dihydroxy-benzophenone, complex chromium compound. | 1-aminoanthraquinone. | reddish brown. |
| Do. | 1-amino-2-methyl-4-benzoylamino-5-chlorobenzene. | Do. |
| 1-amino-2-hydroxy-5-chlorobenzene → 2,4-dihydroxy-benzophenone, complex nickel compound. | do. | Do. |
| 1-amino-2-hydroxy-5-methylbenzene → 2,4-dihydroxy-benzophenone, complex nickel compound. | 1-aminoanthraquinone. | medium brown. |
| 1-amino-2-hydroxy-5-methylbenzene → 2,4-dihydroxy-benzophenone, complex chromium compound. | 4-amino-3,2'-dimethyl-1,1'-azobenzene. | red-brown. |

| Coupling component | Diazo component | Tint |
| --- | --- | --- |
| 1-amino-2-hydroxy-5-nitrobenzene → 2,4-dihydroxy-benzophenone, complex copper compound. | ..... do ..... | Do. |
| Do. | 1-amino-2-methyl-4-benzoylamino-5-chlorobenzene. | reddish brown. |
| Do. | 1-amino-2-methoxy-5-benzylsulfonylbenzene. | brown. |
| 1-amino-2-hydroxy-5-nitrobenzene → 2,4-dihydroxy-benzophenone, complex nickel compound. | ..... do ..... | dark brown. |
| Do. | 1-amino-2-methyl-4-benzoylamino-5-chlorobenzene. | reddish brown. |
| Do. | 4-amino-3,2'-dimethyl-1,1'-azobenzene. | red-brown. |
| 1-amino-2-hydroxy-5-nitrobenzene → 2,4-dihydroxy-benzophenone, complex chromium compound. | 1-amino-2-methyl-4-benzoylamino-5-chlorobenzene. | reddish brown. |
| Do. | 1-amino-2-methoxy-5-benzylsulfonylbenzene. | brown. |
| 1-amino-2-hydroxy-5-methyl-sulfonylbenzene → 2,4-dihydroxy-benzophenone, complex nickel compound. | 4,4'-diamino-3,3'-dimethoxydiphenyl. | Do. |

We claim:

1. The complex metal compounds selected from the group consisting of iron, cobalt, chromium, nickel, copper and manganese compounds of azo-dyestuffs corresponding to the following general formula

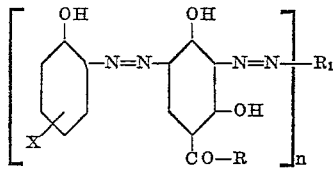

wherein R represents a member selected from the group consisting of lower alkyl and phenyl, $R_1$ represents a member selected from the group consisting of radicals of the benzene, diphenyl and anthraquinone series, X represents a member selected from the group consisting of chlorine, nitro, methyl and methylsulfonyl, and $n$ stands for one of the numbers 1 and 2.

2. The complex cobalt compound of the azo-dyestuff corresponding to the following formula

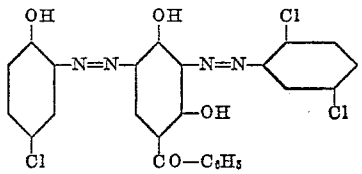

3. The complex cobalt compound of the azo-dyestuff corresponding to the following formula

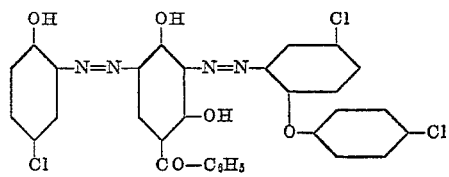

4. The complex cobalt compound of the azo-dyestuff corresponding to the following formula

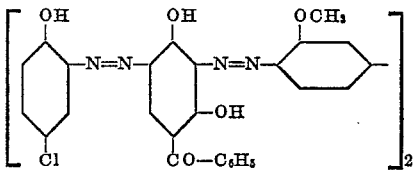

5. The complex cobalt compound of the azo-dyestuff corresponding to the following formula

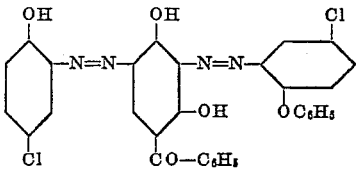

6. The complex cobalt compound of the azo-dyestuff corresponding to the following formula

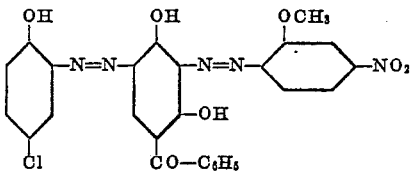

References Cited in the file of this patent

UNITED STATES PATENTS

| 2,093,402 | Dahlen | Sept. 21, 1937 |
| 2,174,998 | Rossander et al. | Oct. 3, 1939 |